US010664798B2

(12) United States Patent
Lorenzini et al.

(10) Patent No.: US 10,664,798 B2
(45) Date of Patent: *May 26, 2020

(54) CAPTURING PRODUCT DETAILS OF PURCHASES

(71) Applicant: BlinkReceipt, LLC, Brooklyn, NY (US)

(72) Inventors: Court V. Lorenzini, Mercer Island, WA (US); Samuel Anthony Lucente, San Francisco, CA (US); Roy Penn, Seattle, WA (US); Morgan Doocy, Seattle, WA (US); Shawn Rutledge, Seattle, WA (US)

(73) Assignee: BlinkReceipt, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,677

(22) Filed: Sep. 11, 2017

(65) Prior Publication Data

US 2018/0025314 A1    Jan. 25, 2018

Related U.S. Application Data

(63) Continuation of application No. 15/046,163, filed on Feb. 17, 2016, now Pat. No. 9,792,579.

(Continued)

(51) Int. Cl.
| | |
|---|---|
| *G06F 17/00* | (2019.01) |
| *G06K 15/00* | (2006.01) |
| *G06Q 30/00* | (2012.01) |
| *G06F 19/00* | (2018.01) |
| *G06Q 90/00* | (2006.01) |
| *G06Q 10/08* | (2012.01) |
| *G06K 9/00* | (2006.01) |
| *G06K 9/62* | (2006.01) |

(Continued)

(52) U.S. Cl.
CPC ....... *G06Q 10/087* (2013.01); *G06K 9/00469* (2013.01); *G06K 9/18* (2013.01); *G06K 9/3258* (2013.01); *G06K 9/40* (2013.01); *G06K 9/6215* (2013.01); *G06K 2209/01* (2013.01)

(58) Field of Classification Search
USPC ........................................ 235/385, 375, 383
See application file for complete search history.

(56) References Cited

U.S. PATENT DOCUMENTS

| 7,158,948 B1 | 1/2007 | Rodriguez et al. |
| 7,428,988 B1 | 9/2008 | Starr |

(Continued)

*Primary Examiner* — Tuyen K Vo
(74) *Attorney, Agent, or Firm* — Athorus, PLLC

(57) ABSTRACT

Systems, methods and computer-readable media are disclosed for capturing purchase information regarding purchased items of a consumer. Upon receiving an image of a receipt (a receipt image) regarding a list of purchased items, receipt text is generated. The receipt text is processed to identify the purchased items in the receipt image. Accordingly, an iteration is begun to iterate through the item blocks of the receipt text. An item block corresponds to a discrete item in the receipt text. The processing comprises extracting textual elements from the item block and matching the textual elements to a known product. Upon matching the textual elements to a known product, the consumer inventory associated with the consumer is updated with regard to the purchase of the known product.

17 Claims, 11 Drawing Sheets

Related U.S. Application Data

(60) Provisional application No. 62/181,039, filed on Jun. 17, 2015.

(51) Int. Cl.
*G06K 9/40* (2006.01)
*G06K 9/18* (2006.01)
*G06K 9/32* (2006.01)

(56) References Cited

U.S. PATENT DOCUMENTS

| | | |
|---|---|---|
| 7,780,081 B1 | 8/2010 | Liang |
| 8,219,558 B1 | 7/2012 | Trandal et al. |
| 8,805,125 B1 | 8/2014 | Kumar et al. |
| 9,922,375 B1 | 3/2018 | Neveu |
| 2002/0165872 A1 | 11/2002 | Meltzer et al. |
| 2004/0083134 A1 | 4/2004 | Spero et al. |
| 2004/0098664 A1 | 5/2004 | Adelman et al. |
| 2004/0193538 A1 | 9/2004 | Raines |
| 2006/0262910 A1 | 11/2006 | Molnar et al. |
| 2008/0219543 A1 | 9/2008 | Csulits et al. |
| 2008/0288509 A1* | 11/2008 | Mysen .............. G06F 17/30864 |
| 2008/0313165 A1* | 12/2008 | Wu ...................... G06Q 10/101 |
| 2009/0006151 A1 | 1/2009 | Zarghami et al. |
| 2009/0110287 A1 | 4/2009 | Bates et al. |
| 2010/0017314 A1 | 1/2010 | Johnson et al. |
| 2010/0054605 A1 | 3/2010 | Molnar et al. |
| 2010/0082454 A1 | 4/2010 | Narayanaswami et al. |
| 2010/0185368 A1 | 7/2010 | Schneider et al. |
| 2010/0217678 A1* | 8/2010 | Goncalves ........... G06Q 20/203 705/22 |
| 2010/0306080 A1* | 12/2010 | Trandal ................. G06Q 10/10 705/26.8 |
| 2011/0052075 A1 | 3/2011 | Comay et al. |
| 2011/0313917 A1 | 12/2011 | Lawson et al. |
| 2012/0185368 A1 | 7/2012 | Schloter et al. |
| 2012/0189186 A1 | 7/2012 | Csulits et al. |
| 2013/0009774 A1* | 1/2013 | Sabeta ................ G06Q 30/016 340/540 |
| 2013/0201307 A1 | 8/2013 | Schloter et al. |
| 2013/0204754 A1 | 8/2013 | Brelig et al. |
| 2014/0003727 A1 | 1/2014 | Lortz et al. |
| 2014/0006198 A1* | 1/2014 | Daly .................... G06Q 30/06 705/24 |
| 2014/0064618 A1 | 3/2014 | Janssen, Jr. |
| 2014/0095985 A1 | 4/2014 | Argue et al. |
| 2014/0249947 A1 | 9/2014 | Hicks et al. |
| 2015/0153982 A1 | 6/2015 | Berarducci et al. |
| 2015/0161704 A1* | 6/2015 | Lempel ............. G06Q 30/0629 705/14.53 |
| 2015/0379887 A1 | 12/2015 | Becker et al. |
| 2016/0180467 A1 | 6/2016 | Griffin et al. |
| 2016/0371632 A1 | 12/2016 | Lorenzini et al. |
| 2017/0083968 A9 | 3/2017 | Hicks et al. |

* cited by examiner

CAPTURING PRODUCT DETAILS OF PURCHASES

CROSS REFERENCE TO RELATED APPLICATIONS

This matter is a continuation of and claims priority to U.S. patent application Ser. No. 15/046,163, filed Feb. 17, 2016, the subject matter of which is incorporated herein by reference. This matter claims the benefit of provisional patent application U.S. 62/181,039, filed Jun. 17, 2015, which is incorporated herein by reference. This matter is related to U.S. patent application Ser. No. 14/526,451, filed Oct. 28, 2014, which is incorporated herein by reference.

BACKGROUND

Currently, while vendors of many types of goods are able to identify (to some degree or another) the consumers of their goods and, in many cases, provide customer loyalty and reward programs, at least one substantial segment of vendors is left out of this ability: foodstuff vendors. In short, foodstuff vendors are unable to acquire basic information regarding household foodstuff usage.

There are multiple reasons that foodstuff vendors are unable gain access to consumer purchase and usage, but the primary reason is due to the current, ubiquitous method by which consumers purchase foodstuff items—through a grocery store.

A foodstuff vendor is likely able to determine the amount of goods it provides to various grocery stores. However, information regarding what is sent to various stores is nearly the extent of the information that a foodstuff vendor is able to access—the vendors have no access into how the foodstuff items are sold to consumers, or how many, or which consumers purchase which goods. Even when consumers utilize coupons, the coupons are generally redeemed through the grocery stores such that information regarding the consumer that redeems the coupon is not relayed to the vendor. Simply stated, grocery stores do not share information regarding their customers with vendors—i.e., what a specific household may purchase, when, how much, which brands, and the like.

In U.S. patent application Ser. No. 14/526,451, filed Oct. 28, 2014, a novel system and method for aggregating foodstuff data such that consumer purchase and usage information can be made available to foodstuff vendors is described. This related application describes the use of a computer-executable tool (e.g., an app or application) that provides a useful service to its users and, through its use, is able to identify foodstuff usage data that can be made available to foodstuff vendors without disclosing specific identifying information regarding the user/consumer household.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Systems, methods and computer-readable media are disclosed for capturing purchase information regarding purchased items of a consumer. Upon receiving an image of a receipt (a receipt image) regarding a list of purchased items, receipt text is generated. The receipt text is processed to identify the purchased items in the receipt image. Accordingly, an iteration is begun to iterate through the item blocks of the receipt text. An item block corresponds to a discrete item in the receipt text. The processing comprises extracting textual elements from the item block and matching the textual elements to a known product. Upon matching the textual elements to a known product, the consumer inventory associated with the consumer is updated with regard to the purchase of the known product.

According to additional aspects of the disclosed subject matter, a computer-implemented method for capturing information of purchased items to a consumer inventory of a consumer is presented. In execution upon a computing device, the method receives a receipt image from a consumer of a purchase receipt of a first set of purchased items. Receipt text is generated from the receipt image and an iteration is begun to repeatedly identifying a next item block of the receipt text. Each item block processed until all item blocks of the receipt text are processed. In processing an item block, textual elements are extracted from the item block. The textual elements are then matched to a known product, and a consumer inventory of the consumer is updated with regard to the purchase of the known product.

According to further aspects of the disclosed subject matter, computer-readable media bearing computer-executable instructions for carrying out a method for capturing information of purchased items to a consumer inventory of a consumer is presented. The method, in execution, comprises receiving a purchase list of a first set of purchased items. For each purchased item in the first set of purchased items, the purchased item of the first set is added to the consumer inventory of the consumer. Moreover, the purchased item of the first set is added to the consumer inventory of the consumer as a non-specific item of inventory. A receipt image from a consumer of a purchase receipt of a second set of purchased items is also received. At least one purchased item of the second set of purchased items is in the first set of purchased items. Receipt text from the receipt image is generated and an iteration is begun to identify the item blocks of the receipt text and process the item blocks until all item blocks of the receipt text are processed. In processing an item block, textual elements from the item block are extracted. The textual elements are then matched to a known product and the known product is matched to an item already added to the consumer inventory of the consumer as a non-specific item of inventory. The item of inventory already added to the consumer inventory of the consumer as a non-specific item of inventory is then updated with information regarding the known product and the item of inventory already added to the consumer inventory of the consumer is converted as a non-specific item of inventory as a specific item of inventory.

According to still further aspects of the disclosed subject matter, a computing system for capturing information of purchased items to a consumer inventory of a consumer is presented. The computing system comprises a processor and a memory, where the processor executes instructions stored in the memory as part of or in conjunction with additional components of computing system in capturing information of purchased items to a consumer inventory of a consumer. The additional components include a network communication component, a consumer interface, a non-specific item processor, and a receipt processor. In operation, the network communication component communicates on behalf of the computing system with one or more computing devices over a communication network. The consumer interface is configured to interact with a consumer via the network communication component, and further configured to receive at least a first list of purchased items, a receipt image regarding a second list of purchased items from a consumer. The non-specific item processor is configured to process the purchased items of the first list of purchased items and update a consumer inventory associated with the consumer with the purchased items of the first list of purchased items. Moreover, the purchased items of the first list of purchased items are updated in the consumer inventory associated with the consumer as non-specific items. The receipt processor is configured to process the receipt image regarding a second list of purchased items, where at least one purchased item of the first list of purchased items is in the second list of purchased items. In processing the receipt image, the receipt processor is configured to generate receipt text from the receipt image regarding the second list of purchased items. Further, an iteration is begun identify the item block of the receipt text and process the item blocks until all item blocks of the receipt text are processed. In processing the item blocks, the receipt processor is further configured to extract textual elements from the item block and match the textual elements to a known product. Further, the known product is matched to an item of inventory already added to the consumer inventory of the consumer as a non-specific item of inventory. The item of inventory already added to the consumer inventory of the consumer as a non-specific item of inventory is updated with information regarding the known product. The item of inventory already added to the consumer inventory of the consumer as a non-specific item of inventory is converted to a specific item of inventory.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For the purposes of clarity, the term "exemplary" in this document should be interpreted as serving as an illustration or example of something, and it should not be interpreted as an ideal and/or a leading illustration of that thing.

The term "foodstuff" or "foodstuff items" should be interpreted as comprising items sold in a grocery store including food items and ingredients used in the preparation of food items. Correspondingly, a "foodstuff vendor" is a vendor that provides foodstuff items to grocery stores (either directly or through intermediaries.)

The term "foodstuff-related items" refers to items that are commonly used in regard to foodstuff preparation. Measuring cups, knives, colanders, parchment paper, foil, cooking spray, dishes, and the like are non-limiting examples of foodstuff-related items. The term "foodstuff usage data" corresponds to information regarding the purchase, preparation, and consumption of foodstuff items as well as the purchase and use of foodstuff-related items.

The term "household" refers to a consumer household in which one or more persons are commonly participating in meals. Thus, when the foodstuff data aggregator obtains information regarding a "household," the foodstuff usage data is viewed (and normalized) in terms of the number of persons in the particular household. Additionally, foodstuff usage data may include the number of people that are guests to a household—a temporary modification to the number of people that are members of the household.

As described in the related application, Aggregating Foodstuff Data, the computer-executable tool can capture purchase information of foodstuff items as well as usage data regarding those items. However, quite often the purchase information is fairly generic: i.e., the consumer (via the computer-executable tool) can indicate that a particular foodstuff item is purchased without identifying the exact item, such as what brand was purchased, the quantity of items that were purchased, the size of each item, the price of each item, etc. For example, a shopping list might call for spaghetti noodles to be purchased. Upon checkout, the consumer may easily indicate (e.g., check off the item from the shopping list provided by an app) that spaghetti noodles were purchased but would not typically provide additional information such as what brand was purchased, how much was purchased, the size of each item purchased, the price of each item, etc. Of course, while even generic consumer foodstuff purchase and usage information is valuable to foodstuff vendors, of greater value is specific purchase and usage information.

Figure 1:
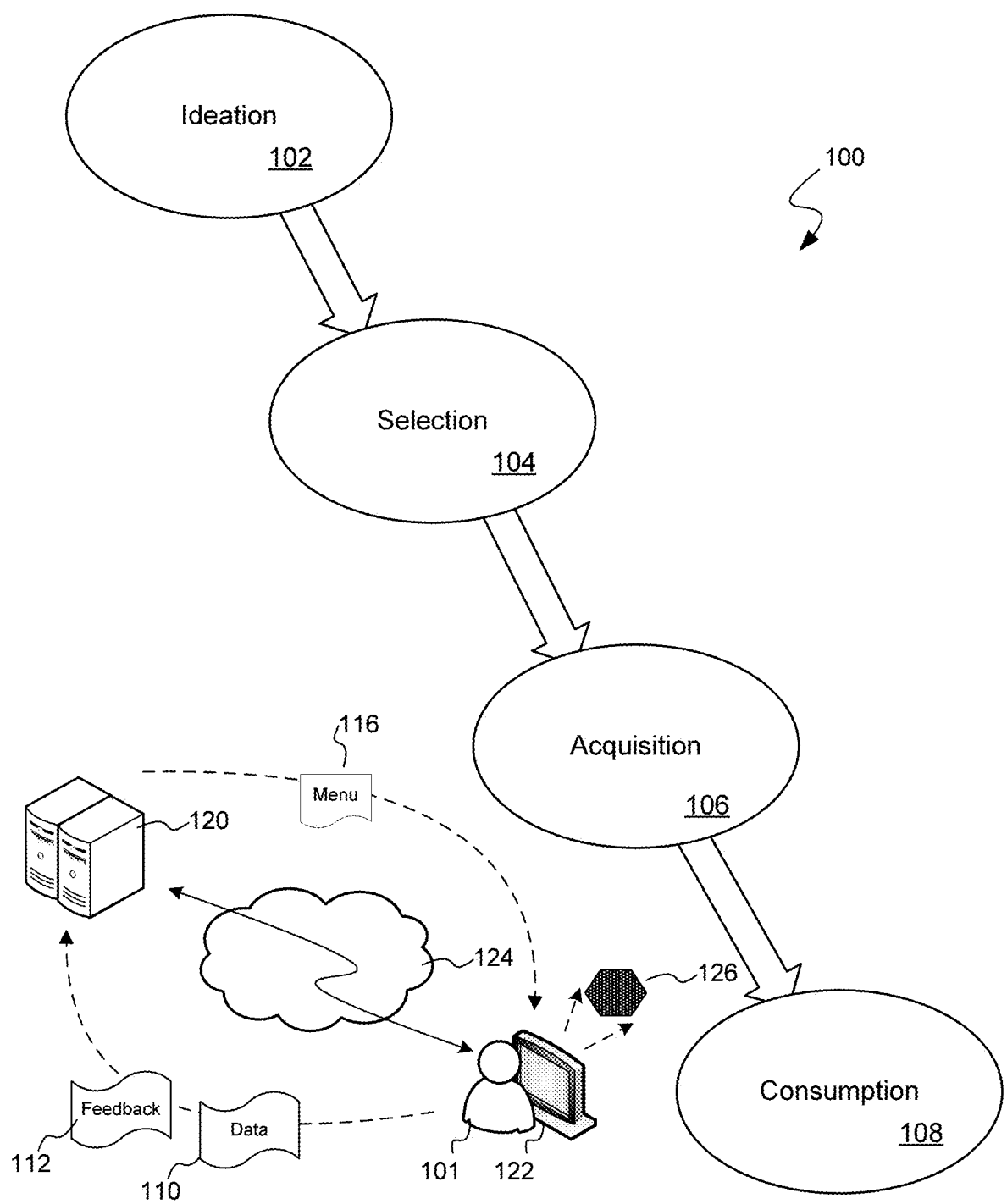
FIG. 1 is a pictorial diagram illustrating an exemplary process flow of the foodstuff data aggregator process between the user/consumer and the data aggregator.

The related application, Aggregating Foodstuff Data, described general phases of capturing foodstuff usage data. As shown in FIG. 1, these phases include: ideation 102, corresponding to providing the consumer (by way of the computer-executable app 126) with ideas and/or suggestions regarding what to prepare for one or more meals; selection 104, corresponding to the consumer selecting from the various menu and menu item options; acquisition 106, corresponding to the acquisition of foodstuff items (and other items) for the preparation of the selected meals; and consumption 108, corresponding to the preparation, usage and consumption of the selected meals or items. During at least these phases, menu information 116 is provided to the consumer 101 (via the computer-executable tool/app 126 executing on a computing device 122 over a network 124) from a foodstuff data aggregator 120, and foodstuff usage data 110 as well as consumer feedback 112 is sent back to the foodstuff data aggregator where the data can be processed and made available to foodstuff vendors.

Figure 2:
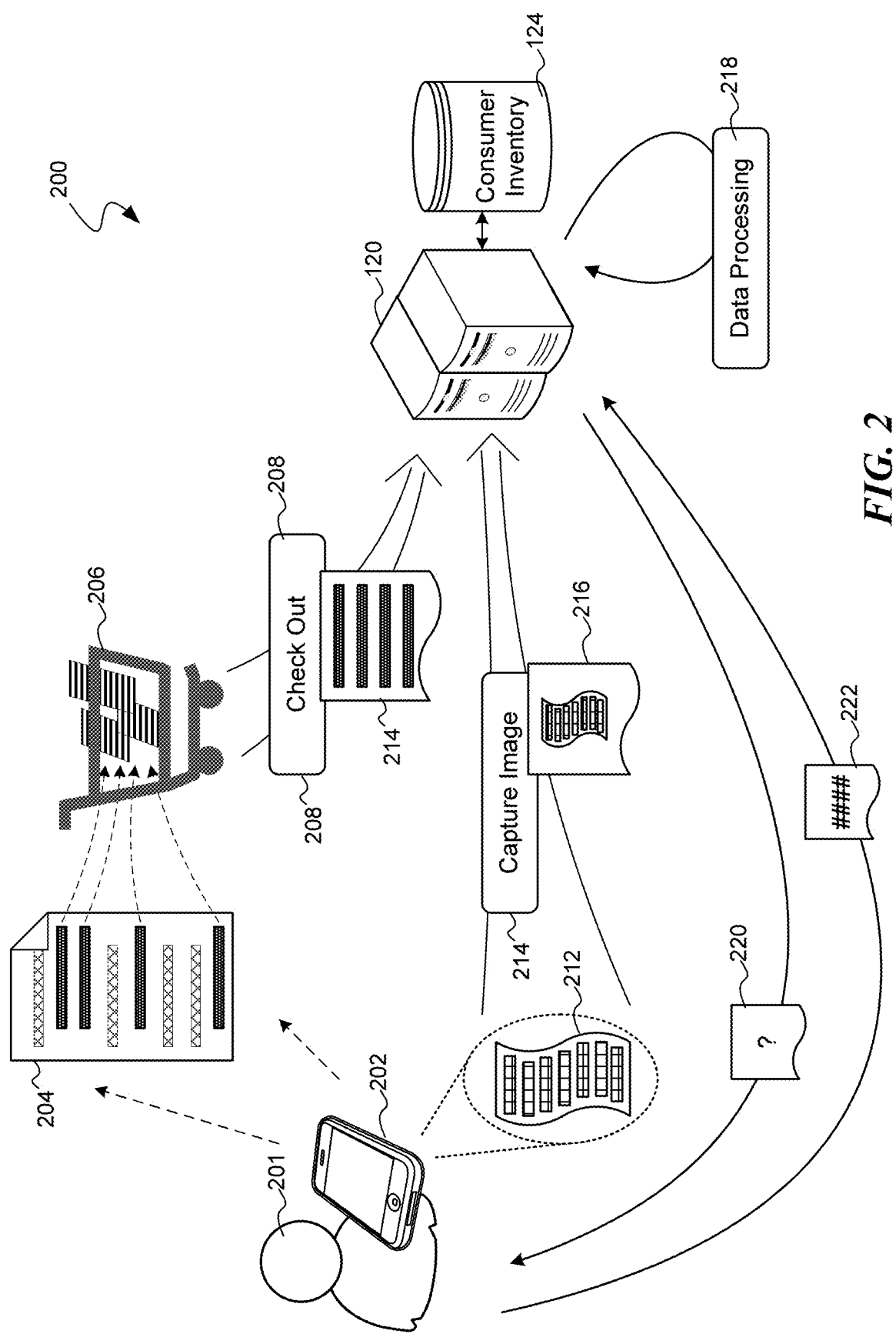
FIG. 2 is a pictorial diagram illustrating an alternative exemplary process flow of the foodstuff data aggregator process between the user/consumer and the data aggregator.

Turning to FIG. 2, during the acquisition phase 106, the consumer is typically concerned with purchasing the ingredients needed to complete a particular selected menu without regard to indicating which particular foodstuff items are purchased. For example, if part of a menu involves spaghetti noodles, the consumer 201 will typically use the shopping list 204 available on the consumer's computing device 202 to make sure that the requisite ingredients are purchased without indicating which brand, quantities, and the like are actually placed in the shopping cart 206. Rather, the consumer will simply check-off items from the list when added to the cart. Additionally, the consumer may indicate that the items were purchased during check-out 208, which causes a list of purchased items 214, those items which were purchased, to be sent to the foodstuff data aggregator 120.

Upon receiving the list of purchased items 214, the foodstuff data aggregator 120 adds the items to the consumer's inventory (indicating that the consumer has these items available) in a consumer inventory store 224. However, since the list of purchased items 214 includes only general information (e.g., spaghetti noodles without brand, price, quantities, sizes, etc.) the information is added to the consumer's inventory as non-specific items. Other information that may be determined, such as the date of the purchase, is also associated with the non-specific items.

As indicated above, while information regarding foodstuff consumption/usage is of value to foodstuff vendors, of greater value is specific foodstuff consumption/usage. Accordingly, in addition to providing the list of purchased items 214 to the foodstuff data aggregator 120, the computer-executable tool/app 126 can prompt the consumer 201 to capture 214 an image 216 of the receipt 212 that the consumer receives from the store in regard to the purchased items. According to aspects of the disclosed subject matter, the receipt image 216 is transmitted to the foodstuff data aggregator 120 for processing 218. During this processing, specific information regarding the items that were purchased is identified and, upon determining the specific information, the non-specific items associated with the consumer in the consumer inventory store 224 are converted to specific items.

Of course, there may be instances in which the data processing 218 is unable to identify information regarding specific items with a sufficient degree of confidence to convert the non-specific items to specific items in the consumer inventory store 224. In these circumstances, and as will discussed in further detail below, the foodstuff data aggregator 120 can submit a request 220 to the consumer 201, via a computer-executable tool/app on the consumer's computing device 202, for additional specifying information regarding one or more purchased items. At the consumer's discretion, the requested specific information 222 is returned to the foodstuff data aggregator 120 where it is processed 218 in order to convert the non-specific items associated with the consumer 201 in the consumer inventory store 224 to a specific item.

With regard to capturing a receipt image 216 of the receipt 212, it is anticipated that many of the consumers will be interacting with the computer-executable app 126 through the use of a so-called mobile computing device, such as computing device 202. These mobile computing devices include, by way of illustration and not limitation, smart phones, personal digital assistants (PDAs), tablet computers, and the so-called "phablet" devices (a hybrid mobile phone and tablet which is typically larger than a typical mobile phone, approaching the size of a small tablet device.) Moreover, as will be readily appreciated, these mobile computing devices typically include a camera component by which the device user can take pictures/capture images and video. Further still, many of these mobile computing devices will also include a flash component that provides lighting while capturing an image. Thus, according to aspects of the disclosed subject matter, computer-executable tool 126 includes executable code that assists the consumer in capturing a receipt image 216 of a receipt 212 and in a manner that is optimally suited for the processing 218 by the foodstuff data aggregator 120 in order to convert non-specific items to specific items of inventory associated with the consumer.

Of course, it is recognized that not all consumers will interact with the computer-executable tool 126 on a mobile computing device. Indeed, according to various aspects of the disclosed subject matter, a suitably configured computer-executable tool will also execute on less portable or non-portable computing device, including (by way of illustration and not limitation): desktop computers, laptop computers, network client terminals, and the like. Typically, these computing devices do not include a camera component, or include a camera component that is not well suited for taking an optimal image of a receipt. Accordingly, when operating on these types of computing devices, the computer-executable tool 126 may be configured to use alternative image capturing devices, such as a scanner, or simply prompt the consumer to provide a suitable image of a given receipt 212.

In regard to those devices that have built-in cameras, the computer-executable tool 126 may aids for optimally capturing a receipt image 216 of the receipt 212. For purposes of this disclosure, optimally capturing an image means to capture an image such that the captured image is in the best condition for processing by the foodstuff data aggregator 120. To optimally capture a receipt image 216 may including positioning the computing device/camera component such that the device is at an optimal or nearly optimal distance from the target (i.e., focal distance from the receipt 212.) This optimal distance is determined as a function of the resolution of the camera component as well as empirical samplings. Typically, the computer-executable tool 126 will determine the type of mobile device upon which it is operating and obtain the optimal conditions (including optimal focal distance) from the foodstuff data aggregator 120. In addition to an optimal focal distance, the optimal conditions may also include lighting considerations. The application of additional light through a flash component to a receipt can aid in the capturing of an optimal image. Current lighting information may be obtained with a light meter component of the mobile device and information regarding what additional lighting should be applied may be obtained from the foodstuff data aggregator 120.

In addition to positioning the mobile device at an optimal focal distance, and applying an appropriate amount of additional lighting, it may also be important to ensure that the mobile device (which is capturing the image of the receipt 212), is properly aligned with the receipt. In other words, typically the mobile device must be aligned along a parallel plane in which the receipt 212 resides. Generally speaking, without proper alignment, the receipt image 216 may include distortions and/or illegible regions.

Figure 3A:
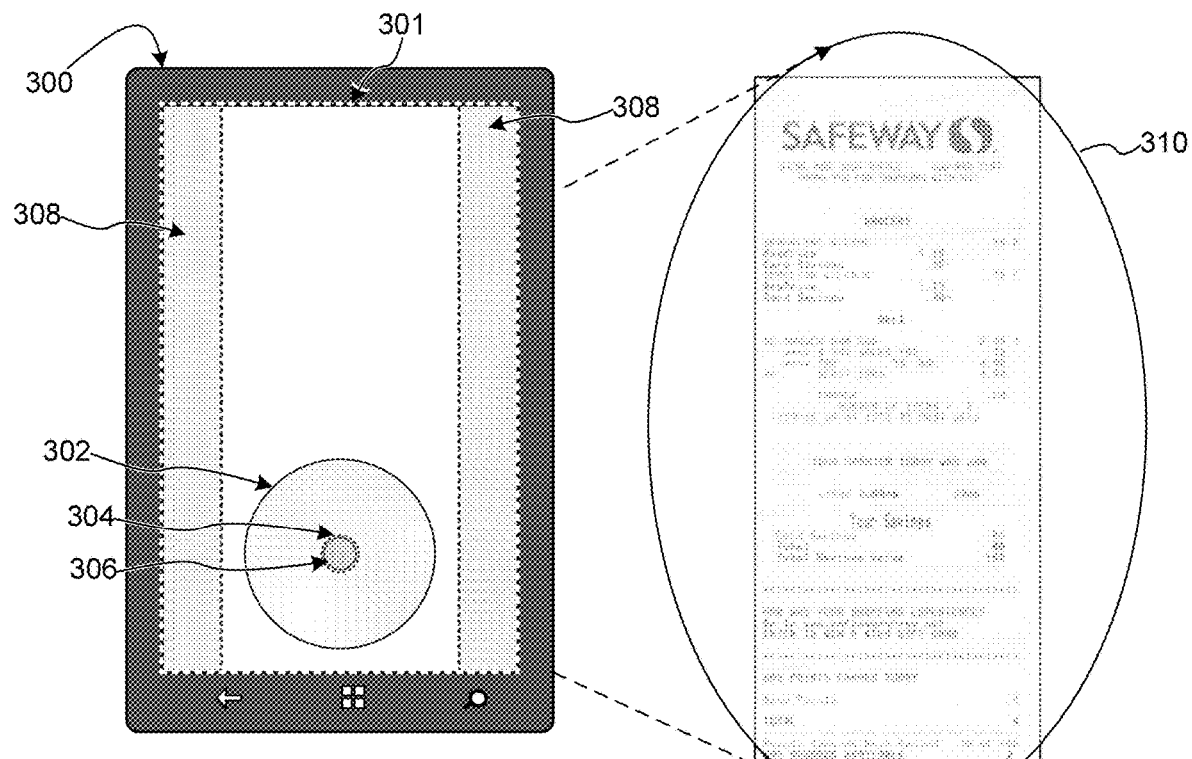
FIGS. 3A-3F illustrate pictorial diagrams visual illustrating image capture aids on a mobile computing device to assist the user/consumer in capturing an optimal receipt image.
Figure 3B:
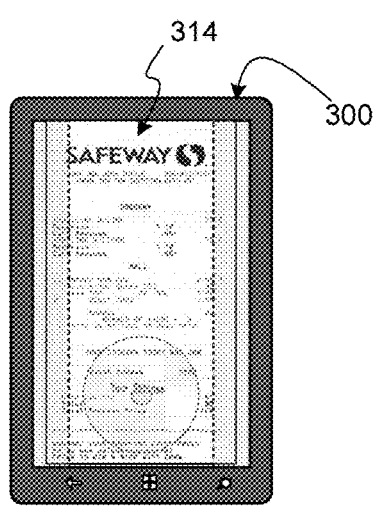
Figure 3C:
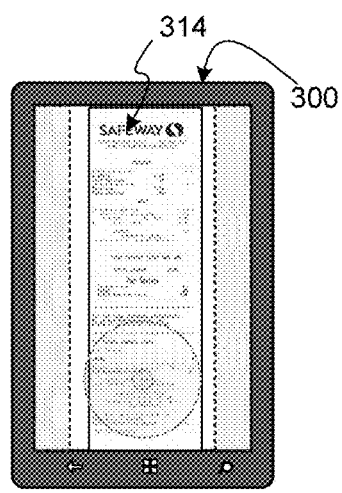
Figure 3D:
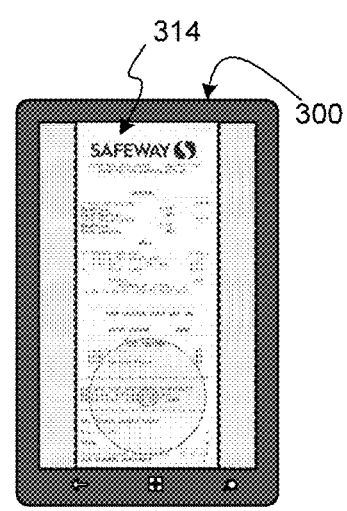

As suggested, in order to capture an optimal receipt image 216, various aids may be presented by the computer-executable tool 126. Turning to FIGS. 3A-3F, FIGS. 3A-3F are pictorial diagrams visual illustrating image capture aids on a mobile computing device 300 to assist the user/consumer in capturing an optimal receipt image 216. The exemplary mobile computing device 300 includes a display area 301 through which the device displays information to the user, including various aids to assist the user in capturing an optimal receipt image 216. According to aspects of the disclosed subject matter, in capturing a receipt image 216, the computer-executable tool 126 displays rails 308 along either side of the display area 301. Further, the rails 308 are sized such that a receipt 212 will completely fill the area between the rails when the mobile device (which includes a camera component—not shown) is at the correct focal distance from the receipt to capture an optimal receipt image 216. According to aspects of the disclosed subject matter, the rails are displayed as transparent rectangles such that image area 310 of the receipt 212 can be seen by the user in order to adjust the focal distance to the receipt. FIGS. 3B-3D illustrate how the image area 310 of the receipt 212 may be presented in the display area 301 of the mobile computing device 300, reflecting conditions where the device is too close to the receipt 212 (as shown in FIG. 3B with receipt view 314 overlapping the rails 308), where the device is too far from the receipt (as shown in FIG. 3C with a noticeable gap between the receipt view and the rails), and where the device is positioned at the correct focal length/distance from the receipt (as shown in FIG. 3D with receive view filling the area between the rails.

As can be seen, there may be instances in which the image area 310 that can be captured in a single image is smaller than the receipt 212. In this circumstance and according to aspects of the disclosed subject matter, the computer-executable tool 126 may be configured to capture multiple images of the receipt and composite the images together to form a composite receipt image (not shown) of the entire receipt 212 before submitting the image to the foodstuff data aggregator 120. Alternatively, the computer-executable tool 126 may be configured to take a video (using the same alignment and lighting tools described herein) as the user pans the receipt 212 and generate a receipt image 216 of the receipt. As will be appreciated by those skilled in the art, both compositing images and converting a video into an image are known in the art. While the compositing and/or video conversion may be conducted by the computer-executable tool 126 on the mobile computing device 126, alternatively the multiple images of a receipt, or the video of a receipt, may be transmitted to the foodstuff data aggregator 120 such that the foodstuff data aggregator performs the compositing and/or conversion of a video.

Figure 3E:
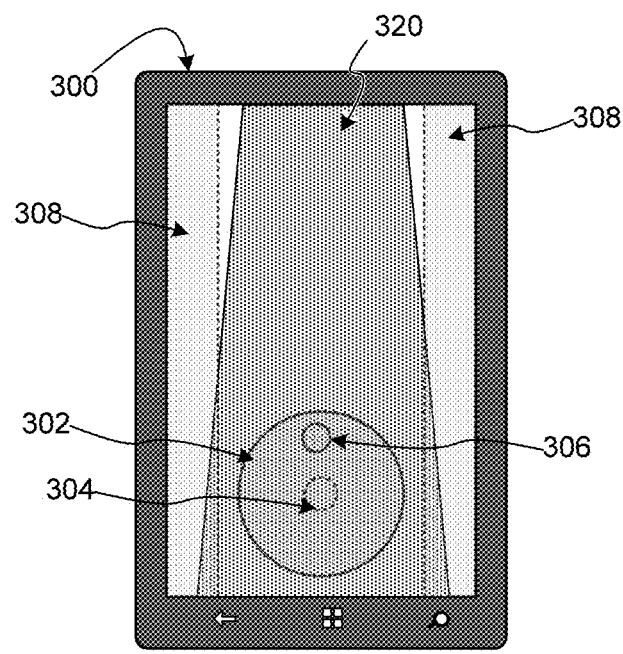
Figure 3F:
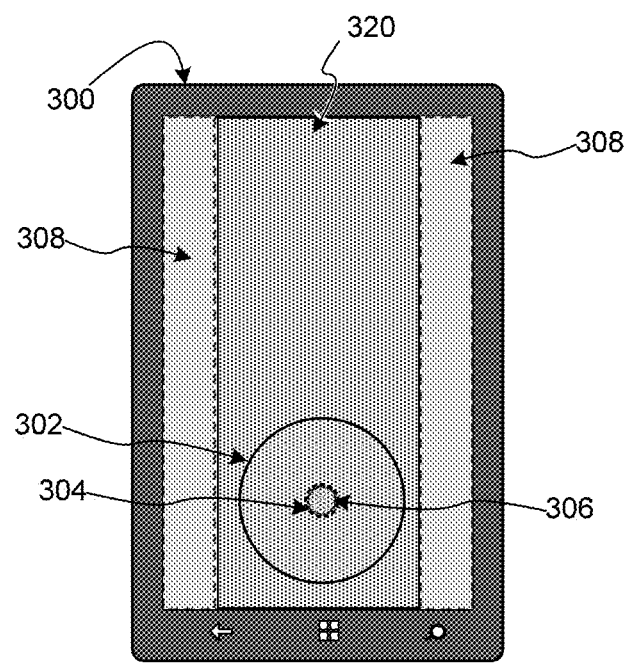

As indicated above, in addition to positioning the mobile computing device 300 at the correct focal distance for capturing a receipt image 216 of the receipt 212, aids are also provided to align/level the device with the receipt. To that end, the computer-executable tool 126 also presents a leveling control 302 that indicates that the device is level/horizontal. This assumes, of course, that the receipt is placed on a level/horizontal surface when capturing the image. The leveling control includes a "bubble" 306 and a level indicator 304. Turning to FIG. 3E, when the mobile computing device 300 is miss-aligned with the receipt 212 (i.e., they are not aligned in a horizontal plane), the receipt view 320, representing the receipt image that would be captured, will be distorted. The receipt view 320 of FIG. 3E illustrates how the image of the receipt 212 might be captured when the mobile computing device 300 is miss-aligned with the receipt—where a portion of the receipt view 320 falls far between the rails 308 and a portion of the receipt view overlaps with the rails. As can be seen, in this instance the level control 302 is displaying the bubble 306 as falling far outside of the level indicator 304. The user, by arranging the mobile computing device 300 to be parallel along the horizontal plane, causes the bubble 306 to be positioned within the level indicator 304, as shown in FIG. 3F. Correspondingly, the receive view 320 (if positioned at the appropriate focal length) will then fill the area between the rails, indicating that the mobile computing device is in position to capture the image of the receipt 212.

According to aspects of the disclosed subject matter, when capturing one or more images of a receipt 212, the computer-executable tool 126 may be configured to allow the capture of the receipt only when the mobile computing device 300 is located at the appropriate distance from the receipt as determined by the receipt view filling the area between the rails without overlap, and is on a horizontal plan as determined by the leveling control 302. In an alternative embodiment, the computer-executable tool 126 may be configured to automatically capture the receipt image 216 when it determines that the mobile computing device 300 is located at the appropriate distance from the receipt as determined by the receipt view filling the area between the rails without overlap, and is on a horizontal plan as determined by the leveling control 302.

Figure 4:
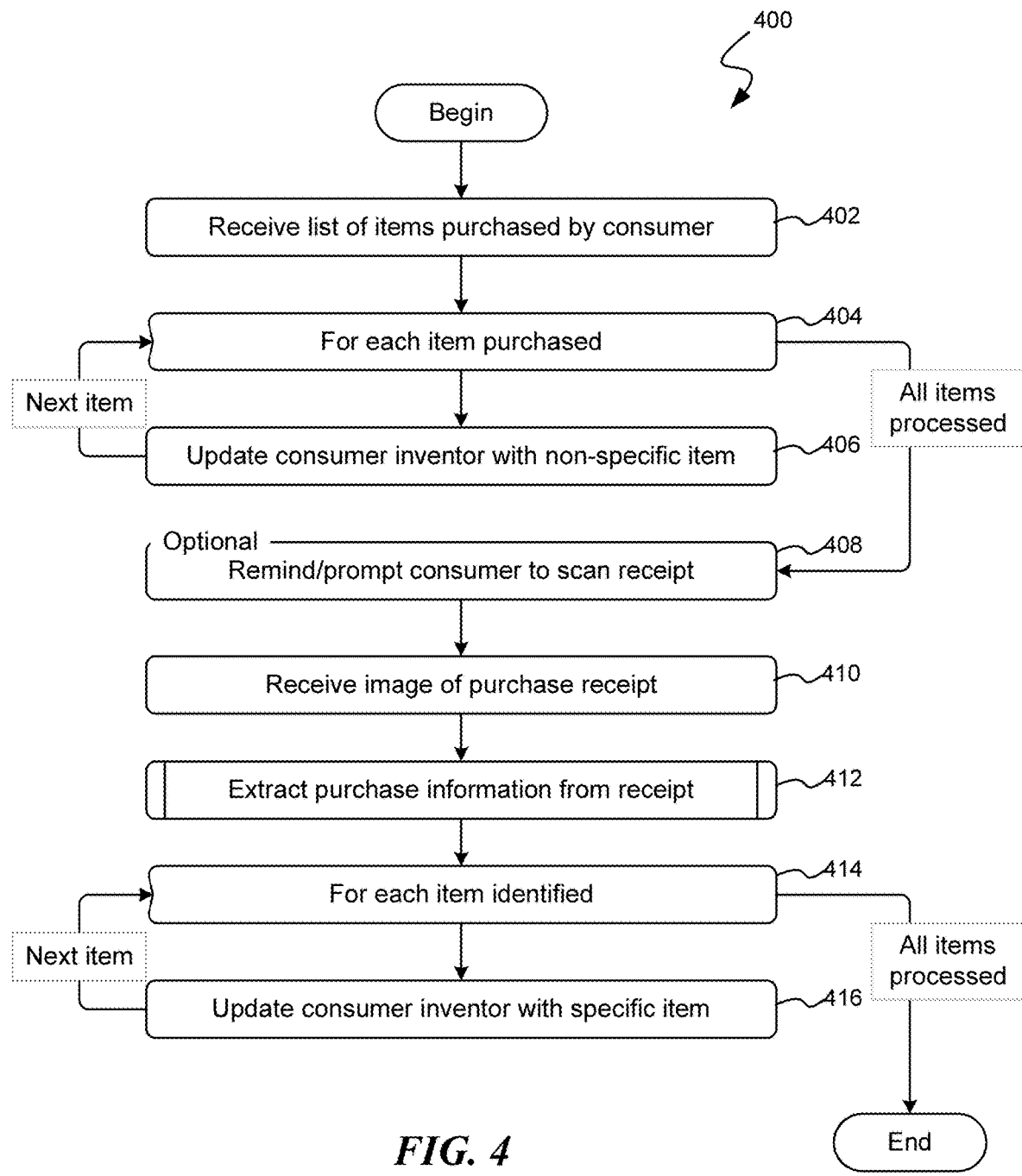
FIG. 4 is a flow diagram illustrating an exemplary routine, as implemented by the foodstuff data aggregator, to process the list of purchased items.

Turning now to FIG. 4, FIG. 4 is a flow diagram illustrating an exemplary routine 400, as implemented by the foodstuff data aggregator 120, to process the list of purchased items 214 (as provided during check out 208). Beginning at block 402, the foodstuff data aggregator receives the list of purchased items 214 by the consumer. At block 404, an iteration is begun to iterate through the items on the list. Thus, for each item on the list of purchased items, at block 406 the consumer inventory associated with the consumer is updated with the item. In this instance, the consumer inventory is updated with a non-specific instance of the item, meaning that only generic information regarding the item, as indicted in the list of purchased items, is known. Using the example from earlier, the list may indicate that the consumer purchased spaghetti noodles (and may indicate a date of the purchase) but information such as specific brand, amount, quantity, size, price, and the like are not generally available. An amount may be assumed by the needs of the shopping list from which the list of purchased items 214 is generated and may be associated with the non-specific item in the consumer inventory for the consumer. However, this, too, is subject to verification, as will be described below.

After adding the item from the list to the consumer inventory of the consumer, the process 400 returns to block 404 to process the next item on the list. This iteration continues until all items on the list have been processed/added to the consumer inventory of the consumer as non-specific items.

At block 408, after having processed the items of the list of purchased items 214, an optional reminder may be sent to the consumer (via the computer-executable tool 216) to scan or capture an image of the receipt for processing by the foodstuff data aggregator 120. At block 410, a receipt image 216 of the receipt 214 is received. At block 412, purchase information regarding the purchased items is extracted. Extracting purchase information from a receipt image 216 is described below in regard to FIG. 5.

Figure 5A:
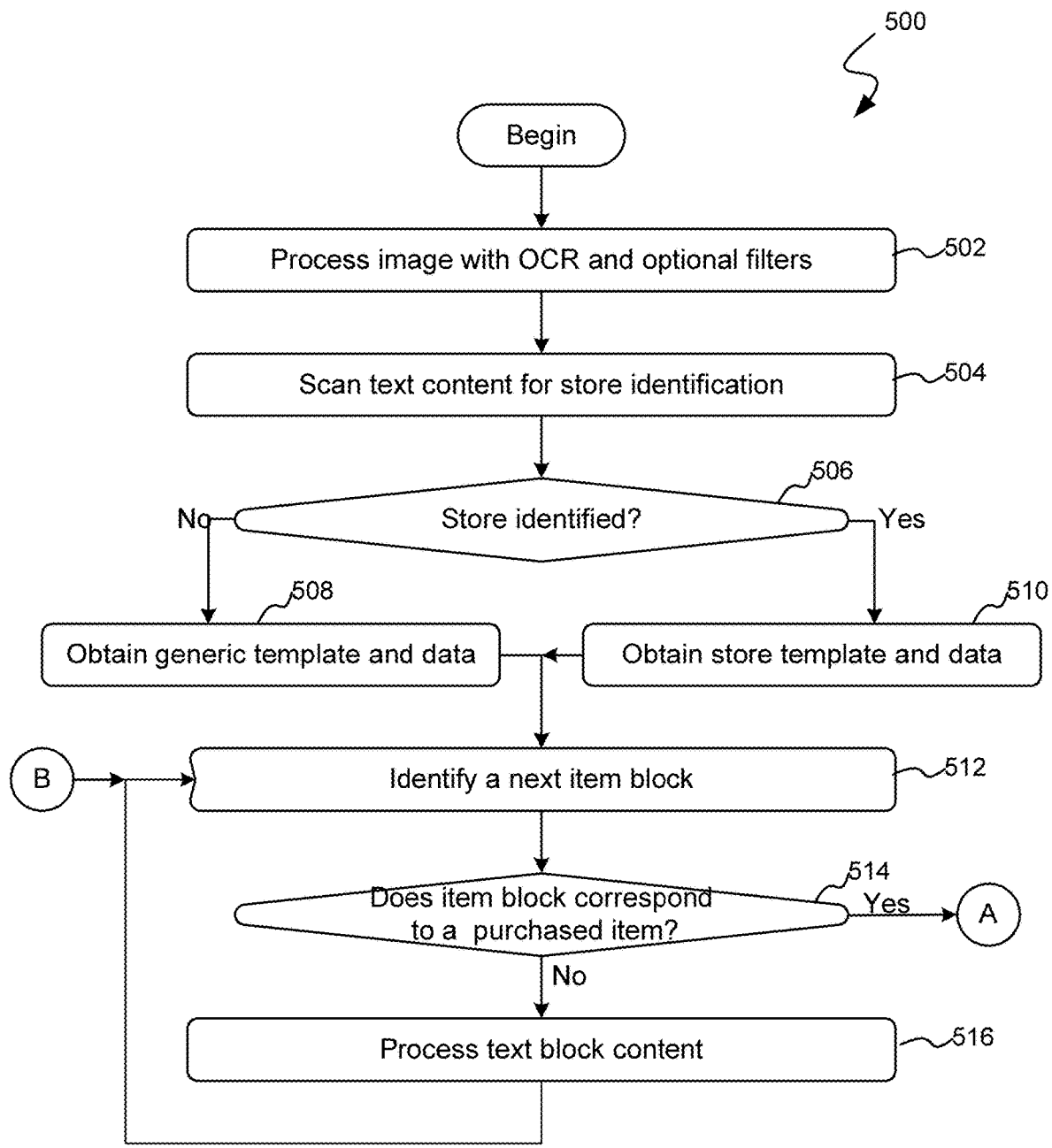
FIGS. 5A and 5B show a flow diagram illustrating an exemplary routine for processing a receipt image to extract purchase information.
Figure 5B:
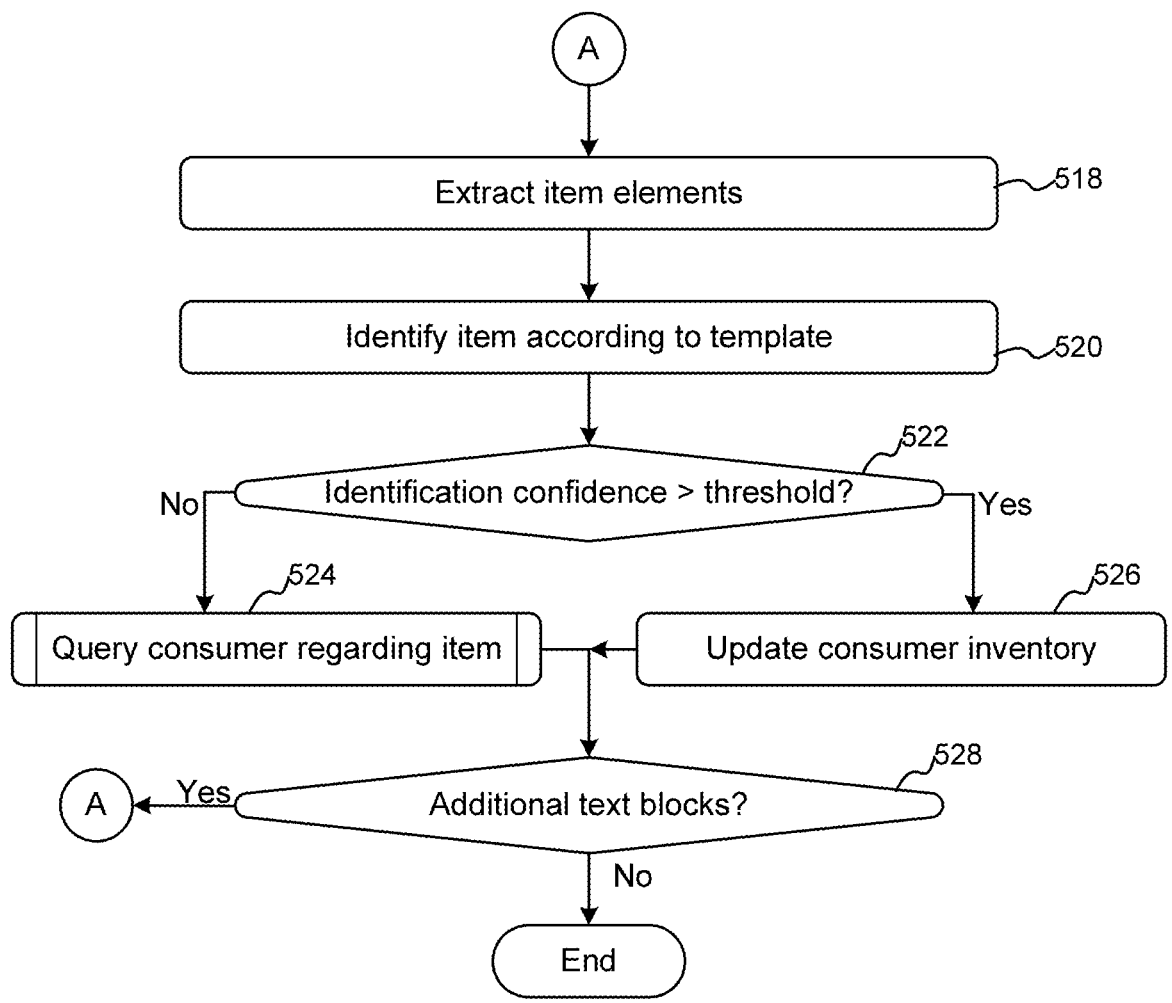
Figure 6:
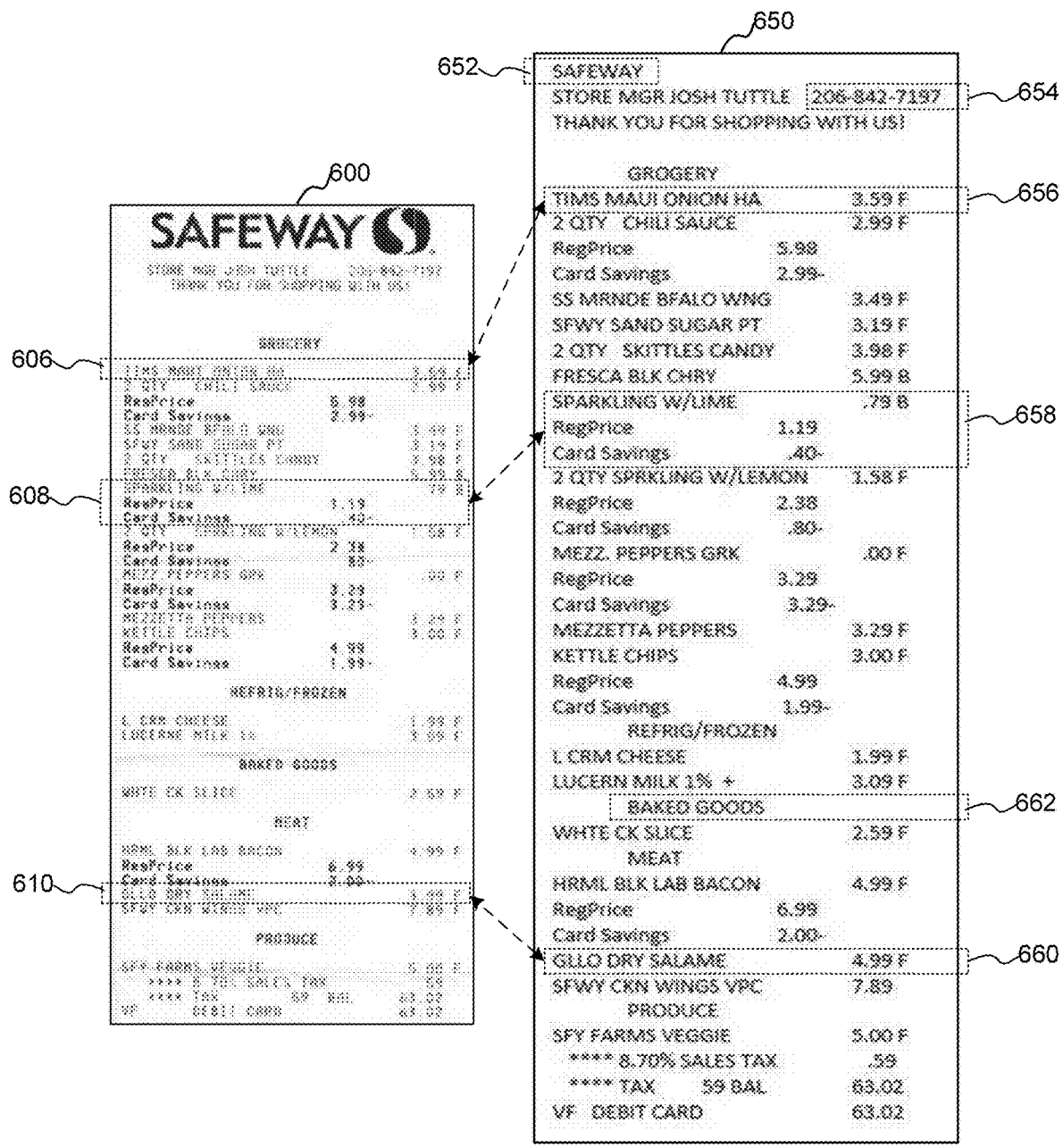
FIG. 6 is a pictorial diagram illustrating an exemplary receipt image and corresponding text conversion.

Turning to FIGS. 5A-5B and 6, FIGS. 5A and 5B show a flow diagram illustrating an exemplary routine 500 for processing a receipt image 216 to extract purchase information, which can then be used to convert non-specific items in the consumer's consumer inventor to specific items. FIG. 6 is a pictorial diagram illustrating an exemplary receipt image 600 and corresponding text conversion 650. Beginning with block 502, the received receipt image 600 is processed by an optical character recognition (OCR) component to extract textual information (receipt text) from the image and generate a corresponding text conversion or receipt text 650. As those skilled in the art will appreciate, using OCR technology to generate a corresponding text conversion is known in the art. Additionally, however, one or more additional, optional filters may be applied to the image (prior to the OCR application) in order to improve the quality of the OCR text extraction. These optional filters, by way of illustration and not limitation, include filters to adjust contrast, white balance, noise reduction, and the like.

At block 504, the receipt text 650 is scanned for identifying information regarding a store at which the items were purchased. Names of stores and textual patterns of store abbreviations may be checked against text in the receipt text 650. In the present example, a scan of the receipt text may identify the store name, Safeway, as found in item block 652, and further identify which Safeway store according to the telephone number listed nearby, as found in item block 654. By particularly identifying the store at which the items in the receipt 600 were purchased, specific store information, such as a template and database of information for matching text to specific purchased items, can be used to improve accuracy in identifying items from the receipt image 600.

As indicated, employing a template and/or data for a particular store can prove very useful in matching abbreviations, cryptic text, receipt organization, quantities, sales prices, regular prices, coupon and rebate information, and the like to specific items of the receipt, as represented in the receipt image 600. Ideally, the purpose is to have the best information (store-specific templates and data) to uniquely identify a given item on the receipt image 600. Indeed, when an item is uniquely identified, the system then has the information needed to map the item to a universal product code (UPC). As those skilled in the art will appreciated, a UPC code uniquely identifies an item among all other items for purchase, including information such as, but not limited to, brand, size, amount, etc. Thus, by using known templates and data of the identified store, a greater degree of accuracy and confidence is achieved in regard to mapping the text of an item on a receipt 212 to specific information.

At decision block 506, a determination is made as to whether the store at which the items were purchased is identified. If the store is not identified (or in the case that there is not information regarding the identified store), routine 500 proceeds to block 508 where a generic template and data for identifying specific information regarding purchased items is selected. Alternatively, at block 510, if the store is identified (and there is a corresponding template and data for the store) the template and data for the specific store is obtained.

At block 512, an iteration of the information in the receipt text 650 is commenced. As a first step of this iteration, the nature of the first/next item block—corresponding to a collection of text converted from the receipt image 216—is identified. More particularly, an item block is a collection of text that corresponds to a discrete item of information from the receipt 212. This discrete item may correspond to a purchased item, organizational information on the receipt, the date of the purchase, information regarding store identity, information regarding the consumer's identity and/or mode of purchase, and the like. While a discrete item block may correspond to a single line of text, such as item 606 corresponding to item block 656, a discrete item may alternatively correspond to multiple lines of text content on the receipt, such as item 608 corresponding to item block 658. An item block may include information regarding the particular item, the regular price, a sales price, reward/coupon information, the quantity purchased, and the like. As each store is likely to have its own arrangement of information on a receipt, the bounds of an item block are typically determined, at least in part, according to the template that is selected in blocks 508 or 510.

At decision block 514, a determination as to whether the item block identified in block 512 corresponds to a purchased item. If it does not correspond to a purchased item, at block 516 the information in the item block is processed and the routine 500 returns to block 512 for additional processing of the receipt text. An example of an item block that does not correspond (directly) to a purchased item is found in item block 662.

Alternatively, if the item block corresponds to a purchased item, the routine 500 proceeds to block 518 (FIG. 5B). At block 518, the various text elements of the item block are extracted. For example, the text elements of item block 660 include "GLLO," "DRY," "SALAME," "4.99," and "F," and corresponding to item 610 on the receipt image 600. At block 520, using the store template (or a generic store template) the routine 500 identifies the item from the elements. Continuing the example above, using the selected template and data, the routine 500 may determine that the "F" likely corresponds to an indication of a food item, that "4.99" likely corresponds to the purchase price, and the combination of "GLLO DRY SALAME" likely corresponds to a foodstuff item, "Gallo Dry Salami." In addition to direct information, based on the particular textual entry, the purchase price, or other information that may be present (such as the actual UPC or a given store's SKU (shop keeping unit)), additional information may be determined. In this case, the additional information that may be determined could include the particular size of the item, e.g., an 8 oz. package of sliced Gallo Dry Salami.

While using the selected template and data may, with complete certainty, identify a particular purchased item, in many cases the confidence in regard to the particular identity of the item will be less than 100 percent. According to aspects of the disclosed subject matter, a confidence value may be assigned to each identification based any of a variety of factors including, but not limited to, the percentage of matches to a known item, similarity in text to known items, variances in price, and the like. Thus, at decision block 522, a determination is made as to whether or not the associated confidence value meets or exceeds a predetermined threshold, e.g., 80 or 90 percent confident. If the confidence value meets or exceeds the predetermined threshold, at block 526 it is assumed to be a match and the particular item for this consumer in the consumer inventory is updated and is converted from a non-specific item to a specific item, and the information regarding the item (brand, size, quantity, purchase price, discounts, coupons used, date purchased, etc.) that has been identified is added/associated with the item in the consumer inventory.

Alternatively, if the confidence value of the match falls below the predetermined threshold, at block 524, the routine 500 queries the consumer regarding the particular item. Querying the consumer regarding items on the receipt is set forth in regard to routine 700 of FIG. 7 below.

After updating the item in the consumer inventory, or querying the consumer regarding the item, at decision block 528 a determination is made as to whether there are any additional item blocks to process. If there are additional item blocks, the routine 500 returns to block 512 to continue the iteration through the various items from the receipt. Alternatively, if there are no more item blocks to process, the routine 500 terminates.

While not shown, an additional, optional step may be taken with regard to obtaining an identification confidence that meets or exceeds the predetermined threshold. More particularly, prior to querying the consumer, an internal party (a person) may be advised of the low confidence level and attempt to correct the problem prior such that the consumer need not be notified. Indeed, the internal party is presented with an item (whose identification confidence falls below the confidence threshold) and is given an opportunity to update the item. Based on any modification the internal party makes, a new identification confidence is determined and, again, compared as to whether the confidence meets or exceeds the predetermined threshold. In the event that the identification confidence meets that threshold, the routine 500 would then (based on the modifications by the internal party) proceed to block 526 as described. Alternatively, the routine 500 would proceed to block 524.

While the above-described routine 500 is made in regard to processing and capturing information from a receipt image and updating non-specific items to specific items in the consumer inventory, it should be appreciated that there may be items extracted from a receipt that have not been previously added as a non-specific item. Indeed, while not shown, in processing the receipt image, the above routine 500 may directly add items to the consumer inventory and indicate whether they are specific or not as determined by the information that is extracted from the receipt.

Returning again to FIG. 4, after having extracted purchase information from the receipt, at block 414 an iteration loop is begun to process the identified items in the purchase information. Thus, in iterating through the identified items, the consumer inventory associated with the consumer is updated for each identified item. Once the consumer inventory is updated with the identified items, the routine 400 terminates.

Figure 10:
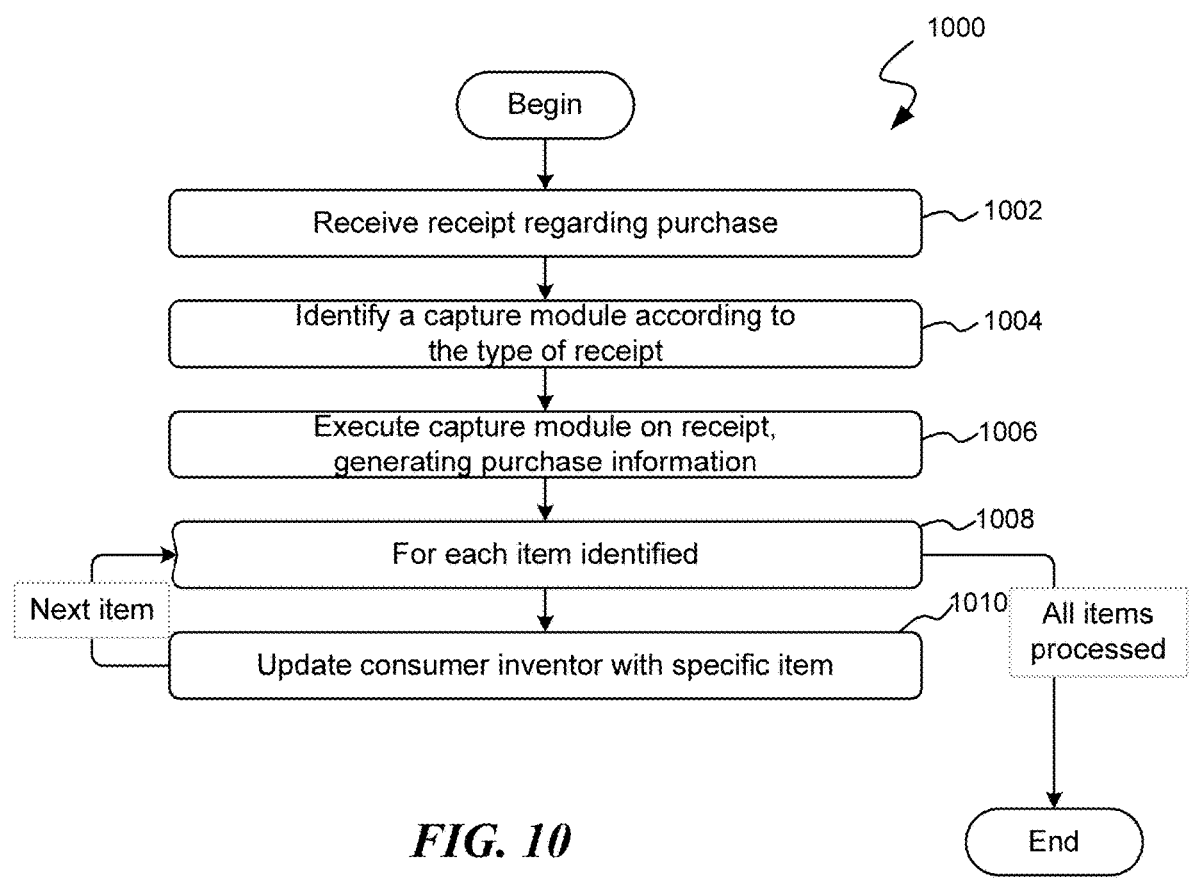
FIG. 10 is a flow diagram illustrating an exemplary routine for general processing of a receipt to a list of purchased items, according to aspects of the disclosed subject matter.

While the description above is made in regard to capturing household inventory information from a receipt image 216, it should be appreciated that overall goal is to capture information regarding purchased items from a receipt (in whatever form) and update the consumer/household inventory with that information. Thus, in alternative embodiments, instead of processing a receipt image, the consumer 201 may receive a receipt in an alternative format. For example, a consumer may receive a receipt by email in which the subject matter of the receipt is textual content. In this, capturing the purchase information from the receipt comprises identifying the text of each item. Further still, the receipt may be an encoded body of data which, when read by an appropriate decoding module, can readily extract the information from the receipt and map that information to household inventory items. In this regard, FIG. 10 illustrates a general flow diagram for processing a general receipt. Beginning at block 1002, the consumer receives a receipt in regard to purchased household items. At block 1004, one or more capture modules are identified according to the type of receipt that is received. These one or more capture modules work in cooperation to identify the various purchased items as indicated in the receipt. Typically, when multiple capture modules are employed, the output of at least one module generates an intermediate form of data which another capture module further processes, until a final list of purchased items is obtained.

At block 1006, the one or more capture modules are employed to capture the items purchased by the consumer, as indicated by the receipt, into information that can be associated with the consumer household as purchased items/inventory. At block 1008, an iteration loop is begun to iterate through the identified items of the receipt. Thus, at block 1010, an identified item is associated with the consumer/household inventory and the routine 1000 returns to block 1008. This iteration process continues until all of the identified items of the receipt have been associated with the consumer/household inventory. Thereafter, routine 1000 terminates.

Figure 7:
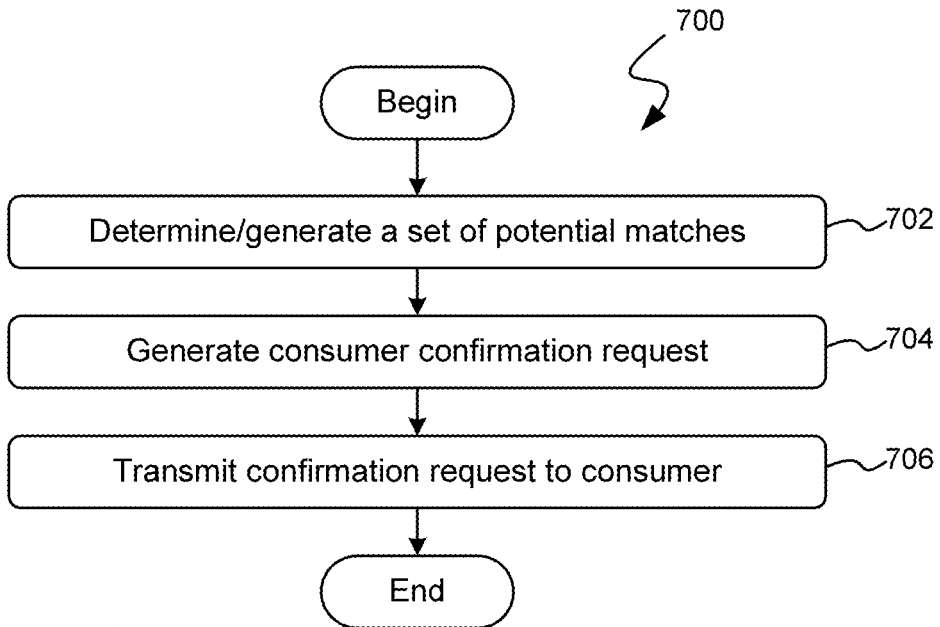
FIG. 7 shows a flow diagram of an exemplary routine for requesting user confirmation of an item on a receipt image.

As suggested above, FIG. 7 shows a flow diagram of an exemplary routine 700 for requesting user confirmation of an item on a receipt image, such as receipt image 600. Beginning at block 702, the routine 700 determines a set of potential matches from which the consumer may select as the correct match. According to aspects of the disclosed subject matter, the set of potential matches for the particular item correspond to those potential matches that are determined to be the "closest" according to a confidence score. While the set of potential matches may include many matches, e.g., 4 or 5 different potential matches, the disclosed subject matter is not constrained to any number. While typically at least one potential match is provided in the set of matches, in various embodiments the set may be an empty set.

At block 704, a consumer confirmation request is generated, the request indicating a request for consumer input regarding the particular item and the set of potential matches as previously determined. Of course, a consumer may indicate that all of the potential matches are incorrect and supply the correct information in response to the request. After generating the request, the confirmation request is transmitted to the consumer (via the computer-executable tool provided to the consumer) for the consumer's selection and/or input regarding the particular item. Thereafter, the routine 700 terminates.

While routine 700 is described in regard to sending a request in regard to a single item on a receipt image, in various embodiments routine 700 may be configured to aggregate all of the items for which consumer confirmation is desired such that only one confirmation request for all items (for a receipt) is sent.

Figure 8:
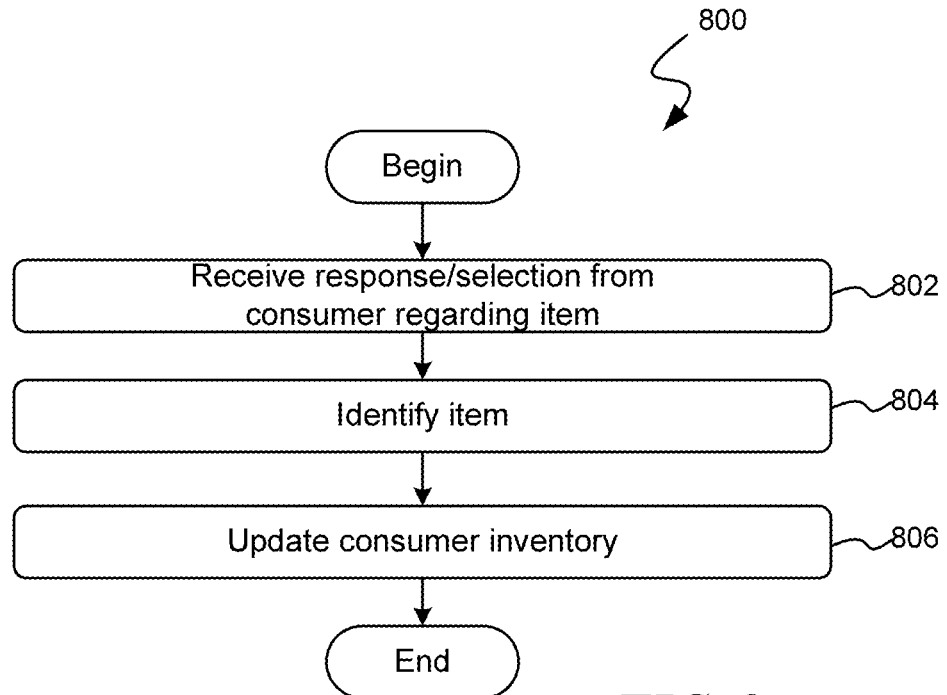
FIG. 8 is a flow diagram illustrating an exemplary routine for receiving a consumer response to a consumer request.

Typically, the confirmation request is submitted to the consumer in an asynchronous manner; i.e., the process is not locked up pending the confirmation from the consumer. Instead, at the consumer's direction, he/she may indicate the requested information via the computer-executable tool and submit that information to the foodstuff data aggregator 120. Accordingly, FIG. 8 is a flow diagram illustrating an exemplary routine 800 for receiving a consumer response to a consumer request (as generated by routine 700.) Beginning at block 802, the foodstuff data aggregator 120 receives the consumer response from the consumer. At block 804, the item for which the consumer responded is identified and, at block 806, the consumer inventory is updated according to the consumer's response, including modifying the item from non-specific to specific.

Regarding the routines described above (in regard to FIGS. 4, 5A-5B, 7 and 85), as well as other processes describe herein, while these routines/processes are expressed in regard to discrete steps, these steps should be viewed as being logical in nature and may or may not correspond to any actual and/or discrete steps of a particular implementation. Moreover, the order in which these steps are presented in the various routines and processes should not be construed as the only order in which the steps may be carried out. Further still, while these routines include various novel features of the disclosed subject matter, other steps (not listed) may also be carried out in the execution of the routines. Those skilled in the art will appreciate that logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on computing devices, such as the device described below in regard to FIG. 9. In various embodiments, all or some of the various routines may also be embodied in hardware modules, including but not limited to system on chips, specially designed processors and or logic circuits, and the like on a computer system.

These routines/processes are typically implemented in executable code comprising routines, functions, looping structures, selectors such as if-then and if-then-else statements, assignments, arithmetic computations, and the like. They may be embodied in web apps, applications and/or apps, as well as system services. However, the exact implementation in executable and/or interpreted statements of each of the routines is based on various implementation configurations and decisions, including programming or encoding languages, compilers, target processors, operating environments, interpreter engines, and the link. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied in applications (also referred to as computer programs), apps (small, generally single or narrow purposed, applications), web apps, and/or methods, these aspects may also be embodied as computer-executable instructions stored by computer-readable media, also referred to as computer-readable storage media. As those skilled in the art will recognize, computer-readable media can host computer-executable instructions for later retrieval and execution. When the computer-executable instructions that are stored on the computer-readable storage devices are executed, they carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may communicate/deliver the computer-executable instructions (and data) to a computing device for execution via various transmission means and mediums, including carrier waves and/or propagated signals, for purposes of this disclosure computer readable media expressly excludes carrier waves and/or propagated signals (i.e., the transmission means of the executable instructions per se.)

Figure 9:
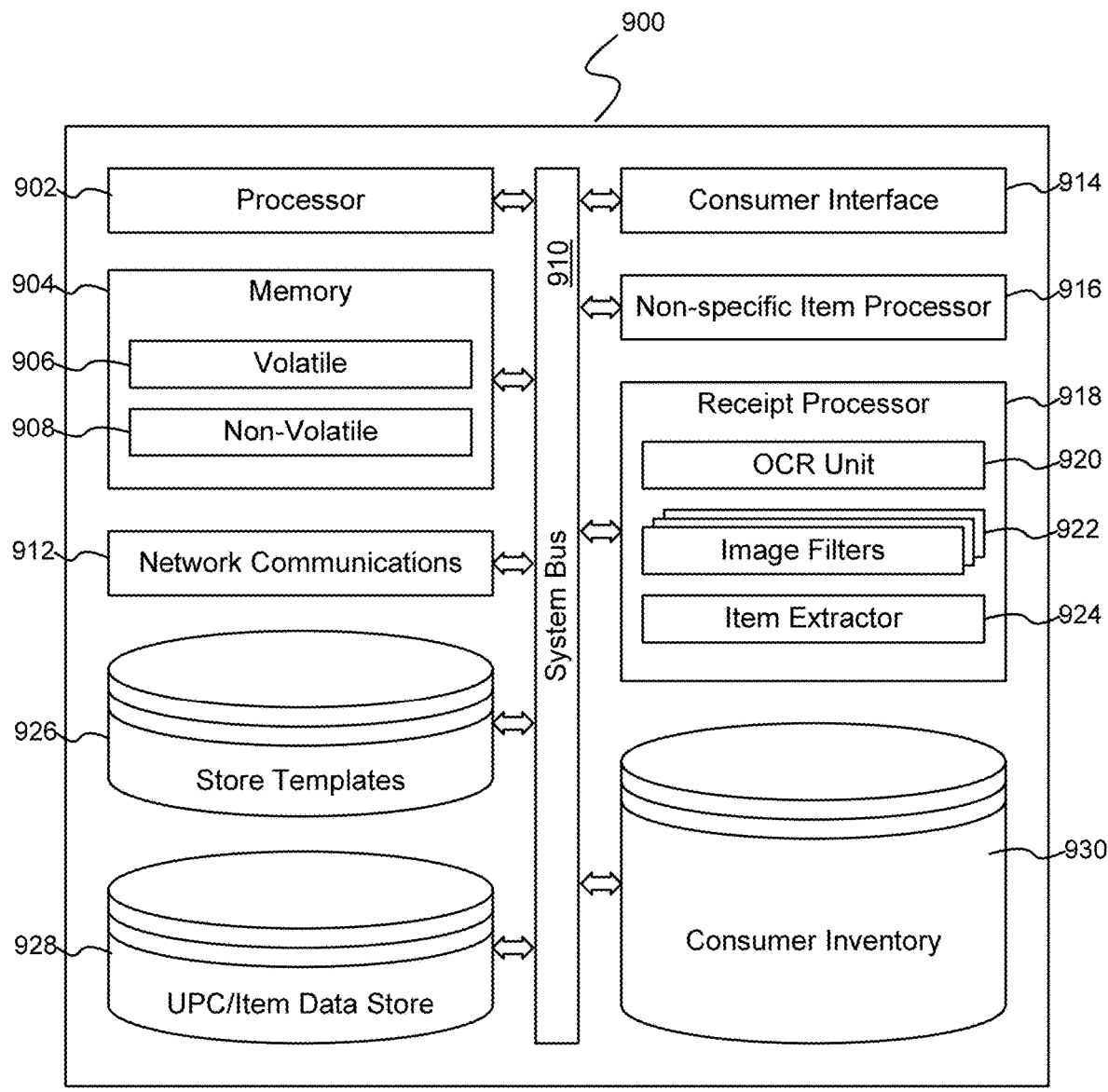
FIG. 9 is a block diagram illustrating exemplary components of a suitably configured computing device for capturing product details of purchases, particularly from receipt images and consumer responses.

Turning now to FIG. 9, FIG. 9 is a block diagram illustrating exemplary components of a suitably configured computing device 900 for capturing product details of purchases, particularly from receipt images and consumer responses. The exemplary computing device 900 includes one or more processors (or processing units), such as processor 902, and a memory 904. The processor 902 and memory 904, as well as other components, are interconnected by way of a system bus 910. The memory 904 typically (but not always) comprises both volatile memory 906 and non-volatile memory 908. Volatile memory 906 retains or stores information so long as the memory is supplied with power. In contrast, non-volatile memory 908 is capable of storing (or persisting) information even when a power supply is not available. Generally speaking, RAM and CPU cache memory are examples of volatile memory 906 whereas ROM, solid-state memory devices, memory storage devices, and/or memory cards are examples of non-volatile memory 908.

Further still, the exemplary computing device 900 includes a network communication component 912 for interconnecting this computing device with other devices over a computer network, including consumer computing devices. The network communication component 912, sometimes referred to as a network interface card or NIC, communicates over a network using one or more communication protocols via a physical (e.g., wired, optical, etc.) connection, a wireless connection, or both. As will be readily appreciated by those skilled in the art, a network communication component, such as network communication component 912, is typically comprised of hardware and/or firmware components (and may also include or comprise software components) that transmit and receive digital and/or analog signals over a transmission medium (i.e., the network.)

The processor 902 executes instructions retrieved from the memory 904 (and/or from computer-readable media) in carrying out various functions, particularly in regard capturing product details of purchased items, as discussed and described above. The processor 904 may be comprised of any of a number of available processors such as single-processor, multi-processor, single-core units, and multi-core units. While a foodstuff data aggregator 120, configured on the computing device 900, might typically be implemented on or across multiple physical computers and/or servers operating as a service on a network, elements of the disclosed subject matter maybe implemented on devices such as laptop computers, desktop computers, mini- and mainframe computers, and the like.

The exemplary computing device 900 also includes a consumer interface component 914 through which the consumer (via the computer-executable tool) submits purchase information and receipt images, as well as responding to confirmation requests. A non-specific item processor component 916 processes the submissions from a consumer regarding items purchased at check out 208, as described above in regard to FIG. 2. The non-specific item processor component 916 extracts as much information as is available from the list of purchased items 214 and adds the items as non-specific items to consumer inventor in a consumer inventor data store 930.

Also included in the computing device 900 is a receipt processor component 918. The receipt processor component 918 processes the receipt images 216 that are captured by the consumer and submitted to the foodstuff data aggregator 120. The receipt processor component 918 includes (or makes use of) various other components including a OCR unit 920, optional image filters 922 for processing the receipt image 216 for optimal translation by the OCR unit, an item extractor 924 that extracts/captures information from a receipt image 216, processes the information, and updates the items in the consumer inventory as specific items when they are identified according to a predetermined level of confidence. Still further, the receipt processor component 918 further includes (or makes use of) a consumer confirmation component 932 which generates consumer requests regarding items that have not been identified according to the predetermined level of confidence for confirmation/feedback from the consumer.

Still further, the computing device 900 includes a store templates data store 926 in which templates and data regarding particular stores is held, and a UPC/Item data store 928 storing robust information regarding a plurality of items such that each is uniquely identified. Information in UPC/Item data store 928 may be used in conjunction with the store template and data when matching item blocks from the receipt image to likely item information.

Regarding the various components of the exemplary computing device 900, those skilled in the art will appreciate that these components may be implemented as executable software modules stored in the memory of the computing device, as hardware modules (including SoCs—system on a chip), or a combination of the two. Moreover, each of the various components may be implemented as an independent, cooperative process or device, operating in conjunction with or on one or more computer systems and or computing devices. It should be further appreciated, of course, that the various components described above in regard to the exemplary computing device should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computer system may be combined together or broke up across multiple actual components and/or implemented as cooperative processes on a computer network.

While various novel aspects of the disclosed subject matter have been described, it should be appreciated that these aspects are exemplary and should not be construed as limiting. Variations and alterations to the various aspects may be made without departing from the scope of the disclosed subject matter. By way of a non-limiting example, while the above description is made in regard to capturing consumer/household purchase information, it should be appreciated that the above-described subject matter may be advantageously, similarly and suitably applied to the purchase of items by groups, businesses, organizations, and the like. Accordingly, in addition to being applicable to capturing consumer/household purchase information, the disclosed subject matter may be applied to a variety of consumer entities.

What is claimed:

1. A computer implemented method for capturing information of purchased items to a consumer inventory of a consumer, the method comprising each of the following as implemented on a computing device:
   receiving a receipt image of a purchase receipt regarding a set of purchased items from a consumer;
   identifying a plurality of item blocks from the receipt image including a first item block;
   matching subject matter of the first item block to a product item from a set of known product items;
   determining a first confidence value of the match of the first item block to the product item from the set of known product items; and
   upon determining that the first confidence value fails to meet or exceed a predetermined threshold:
      generating a set of potential matches for the next item block, the set of potential matches comprising a plurality of known items;
      providing a third party with a confirmation request to identify a match of the first item block, the confirmation request including the set of potential matches for the next item block;
      receiving an identification of a match of the first item block from the third party in response to the confirmation request, the identified match corresponding to one of the set of potential matches for the first item block; and
      updating the consumer inventory of the consumer with the purchase of the identified match.

2. The method of claim 1, wherein the method further comprises repeatedly identifying a next item block of the receipt image and processing the next item block, wherein processing a next item block comprises:
   matching subject matter of the item block to a product item from the set of known products items; and
   updating a consumer inventory of the consumer with regard to the purchase of the known product item by the consumer.

3. The computer-implemented method of claim 2, wherein processing the next item block further comprises determining whether the next item block corresponds to a purchased item, and upon determining that the next item block corresponds to a purchased item:
   matching the subject matter of the next item block to a product item from the set of known product items; and
   updating a consumer inventory of the consumer with regard to the purchase of the next product item by the consumer.

4. The computer-implemented method of claim 3 further comprising:
   identifying a store from the receipt image from which the set of purchased items was purchased; and
   selecting a template corresponding to the identified store, wherein the selected template comprises information for matching subject matter of an item block to a known item available for purchase at the identified store.

5. The computer-implemented method of claim 4, wherein processing the next item block further comprises:
   determining a confidence value of a match between the subject matter of the next item block and the known product item; and
   upon determining that the determined confidence value meets or exceeds a predetermined threshold, updating the consumer inventory of the consumer with regard to the purchase of the known product item by the consumer.

6. The computer-implemented method of claim 5, wherein the set of potential matches for the next item block are selected from a corpus of known product items according to the confidence values of the known product items.

7. The computer-implemented method of claim 6, wherein:
   receiving the identification of a match of the first item block from the third party comprises receiving an identification of a potential match of the set of potential matches; and
   wherein processing the next item block further comprises matching the subject matter of the next item block to a known product item according to the response received from the consumer.

8. The computer-implemented method of claim 1, the method further comprising, upon determining that the first confidence value meets or exceeds a predetermined threshold, updating a consumer inventory of the consumer with indicating the purchase of the known product item by the consumer.

9. The computer-implemented method of claim 8, wherein at least one of the plurality of item blocks comprises multiple horizontal lines of textual content.

10. A computer readable medium bearing computer executable instructions which, when executed on a computing system comprising at least a processor and a memory, carry out a method for capturing information of purchased items to a consumer inventory, the method comprising:
   receiving a receipt image from a consumer of a purchase receipt of purchased items; and
   repeatedly identifying a next item block of the receipt image and processing the next item block until at least some of the item blocks of the receipt image are processed, and wherein processing the next item block comprises:
      matching subject matter of the next item block to a plurality of known product items;
      assigning a confidence value to each of the plurality of known product items, the confidence scores indicative of a confidence of the match between the next item block and the known product item;
      upon determining that the confidence value assigned to the next item block meets or exceeds a predetermined threshold, updating the consumer inventory of the consumer with information regarding the known product item; and
      upon determining that the determined confidence value does not meet or exceed a predetermined threshold:
         generating a set of potential matches for the next item block, the set of potential matches comprising a plurality of known product items;
         providing a third party with a confirmation request to identify a match of the next item block the confirmation request including the set of potential matches for the next item block;
         receiving an identification of a match of the first item block from the third party in response to the confirmation request, the identified match corresponding to one of the known product items of the set of potential matches; and
         updating the consumer inventory of the consumer with information regarding the identified product item.

11. The computer readable medium of claim 10, wherein processing the next item block further comprises determining whether the next item block corresponds to a purchased item, and upon determining that the next item block corresponds to a purchased item:
   matching subject matter of the next item block to a known product item; and
   updating the consumer inventory of the consumer with information regarding the next known product item.

12. The computer readable medium of claim 11 further comprising:
   identifying a store from the receipt image from which the set of purchased items was purchased; and
   selecting a template corresponding to the identified store, wherein the selected template comprises information used for matching subject matter of an item block to a known product item available for purchase at the identified store; and
   wherein matching subject matter to a known product item is assisted by using the selected template.

13. The computer readable medium of claim 12, wherein processing the next item block further comprises:
   determining a confidence value of a match between the next item block and the known product item; and
   upon determining that the determined confidence value meets or exceeds a predetermined threshold, updating the consumer inventory of the consumer with regard to the purchase of the next known product item by the consumer.

14. The computer readable medium of claim 13, wherein processing the next item block further comprises:
   upon determining that the determined confidence value does not meet or exceed a predetermined threshold:
      generating a set of potential matches for the next item block from the plurality of known product items, the set of potential matches comprising potential matches whose determined confidence value with regard to a known product item does not meet or exceed a predetermined threshold;
      including in the consumer confirmation request the set of potential matches; and
      transmitting the consumer confirmation request to the consumer for selection of a match from the set of potential matches.

15. The computer readable medium of claim 14, wherein processing the next item block further comprises:
   receiving a response from the consumer in regard to the consumer confirmation request;
   matching the subject matter of the next item block to a known product item according to the information in the received response from the consumer; and
   updating a consumer inventory of the consumer with regard to the purchase of the known product item by the consumer.

16. A computing system for capturing information of purchased items to a consumer inventory of a consumer, the system comprising a processor and a memory, wherein the processor executes instructions stored in the memory as part of or in conjunction with additional components of the computing system, the additional components comprising:
   a consumer interface for interacting with a consumer and configured to receive at least a receipt image regarding a list of purchased items;
   a receipt processor configured to process the receipt image regarding the list of purchased items, the receipt processor is configured to:
      repeatedly identify a next item block of the receipt image and process each next item block until all item blocks of the receipt image are processed, wherein the receipt processor is further configured to:
         match subject matter of the next item block to a known product;
         assign a confidence value to the next item block indicative of a confidence of the match between the next item block and the known product item;
         upon a determination that the confidence value assigned to the next item block meets or exceeds a predetermined threshold value, update the consumer inventory of the consumer as with information regarding purchase of the known product by the consumer; and
         upon a determination that the confidence value assigned to the next item block does not meet or exceed the predetermined threshold value:

generate a set of potential matches to the next item block;

provide a third party with a confirmation request to identify a match of the next item block, the confirmation request including the set of potential matches to the next item block;

receive an identification of a match of the first item block from the third party in response to the confirmation request, the identified match corresponding to a product item in the set of potential product items; and update the consumer inventory of the consumer with information regarding the identified product item.

17. The computing system of claim 16, wherein the receipt processor is further configured to process the receipt image via one or more image filters to clarify the receipt image.

* * * * *